United States Patent

[11] 3,525,292

[72] Inventors Shin Okamoto
Tokyo, Japan;
Yutaka Seto, Tokyo, Japan
[21] Appl. No. 708,398
[22] Filed Feb. 26, 1968
[45] Patented Aug. 25, 1970
[73] Assignee Konica Camera Corporation
Woodside, New York
[32] Priority Feb. 24, 1967
[33] Japan
[31] No. 42/15,540

[54] SAFETY INTERLOCKS FOR THE CAMERAS WITH INTERCHANGEABLE MAGAZINE AND LENS
7 Claims, 5 Drawing Figs.
[52] U.S. Cl. .................................................... 95/11,
95/19, 95/71
[51] Int. Cl. .............................................. G03b 19/00
[50] Field of Search .................................... 95/11, 19,
49, 71, 11.5

[56] References Cited
UNITED STATES PATENTS
1,032,098 7/1912 Zabrocki ...................... 95/19

FOREIGN PATENTS
611,979 4/1935 Germany ................ 95/49

*Primary Examiner*—Norton Ansher
*Assistant Examiner*—Robert P. Greiner
*Attorney*—McGlew and Toren ABSTRACT: A photographic camera is arranged to mount exchangeable film magazines and includes a shutter release button and a ring for interchangeably mounting objectives on the camera. A movable member has a first position operating a latch rod to lock the release button against movement and releasing a detent plate to provide for rotation of the ring, and a second position, to which it is moved responsive to mounting of a magazine on the camera, operating the rod to disengage the release button for movement and the detent plate to lock the ring. An opaque slide is disengageably insertable into a magazine to block entry of light thereinto and, when in a magazine mounted on the camera, is operable on the movable member to lock the release button and release the ring. When the opaque slide is withdrawn, the release button is unlocked and the ring is locked.

INVENTORS
SHIN OKAMOTO
YUTAKA SETO

ATTORNEYS

INVENTORS
SHIN OKAMOTO
YUTAKA SETO

BY

*McGlew & Toren*
ATTORNEYS

SAFETY INTERLOCKS FOR THE CAMERAS WITH INTERCHANGEABLE MAGAZINE AND LENS

BACKGROUND OF THE INVENTION

When a photographic camera is useable with exchangeable film magazines and interchangeable objectives, opaque light shielding means are usually associated with the magazine to block entry thereinto while the magazine is being mounted on the camera. There is a danger that this opaque shielding means may not be removed before taking a picture, and also a danger that an objective may be interchanged when the opaque shielding means is not in place.

SUMMARY OF THE INVENTION

The invention relates to a safety device for cameras with detachable magazine and interchangeable objective for controlling shutter release operation and exchange of objectives in connection with insertion and withdrawal of an opaque slide plate into or from the magazine so that when the magazine is loaded in the camera, the shutter release is kept inoperable until the opaque slide plate is removed, whereupon the release becomes operable, but the exchange of objectives is rendered inoperative, the exchange of objectives being possible only when the opaque slide plate is placed in the magazine to shield the film from light, or when the magazine proper is removed from the camera. Thus the invention aim is to provide a fool-proof safety device to prevent failures, such as by operating the shutter release when the opaque slide plate is in the magazine or inadvertently changing objectives after the plate has been withdrawn.

BRIEF DESCRIPTION OF THE DRAWINGS

For an understanding of the principles of the invention, reference is made to the following description of a typical embodiment thereof as illustrated in the accompanying drawings.

In the drawings.

DESCRIPTION OF THE PREFERRED EMBODIMENT

Figure 1:
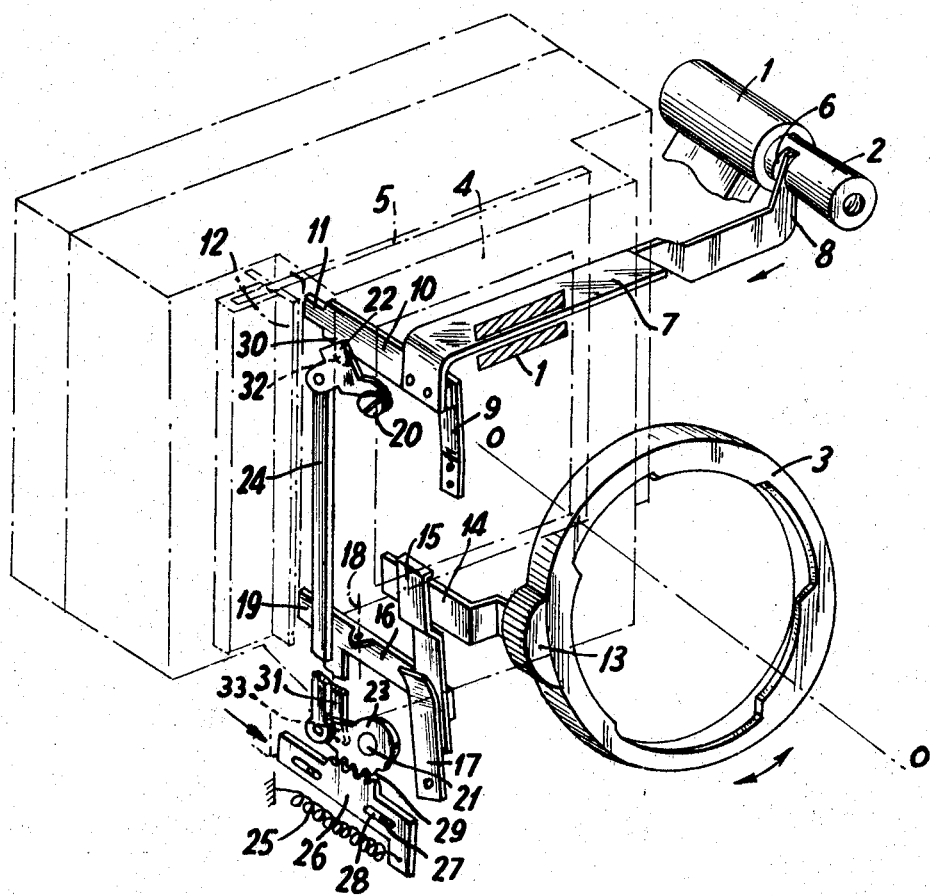
FIG. 1 is a perspective view illustrating components of the invention as associated with a shutter release button and an objective changing device, with the parts being shown in the position occupied when a magazine is removed from the camera.

Referring to the drawing, reference numeral 1 denotes a camera body, 2 a shutter release button, 3 a mounting ring for lens barrel, 4 a film magazine detachably mounted on the camera body 1, and 5 an opaque slide plate which can be inserted into or withdrawn from the magazine 4 for exposing or shielding a photographing aperture in the magazine 4.

The release button 2 is formed with a locking notch 6, and a locking rod 7 is arranged to be slidable horizontally on the camera body, as indicated by an arrow, so that its right-hand end 8 can be engaged with or disengaged from the notch 6. The other end of the rod 7 is urged by a leaf spring 9 so that the end 8 is normally biased away from the notch 6. Also, to the other end of the rod 7 is attached an upper projection bar 10 which extends parallel to the optical axis and towards the magazine 4. The rear end 11 of the bar 10 is positioned so that, when the magazine 4 is loaded in the camera body 1, the end 11 is engaged by a flange 12 provided on the opaque slide plate adjacent to its handle.

The mounting ring 3 is aligned with the optical axis O and is arranged to be rotatable. At a knurled part 13 or any other suitable part of the ring 3 is provided an integral arm 14 which is normally engaged and held by a detent plate 15 which is secured to the forward end of a lower projection bar 16. A leaf spring 17 is secured to the camera body at one end and its other end normally urges the detent plate 15 against the arm 14. The lower projection bar 16 is pivoted at its center to the camera body 1, as indicated at 18, and thus is capable of rocking motion in a horizontal plane. The rear end 19 of the bar 16 is positioned in the same manner as the end 11 of the upper bar 10, to be engaged by the flange 12 of the opaque slide plate 5.

At the outside of the bars 10, 16, pivots 20, 21 secured to the camera body 1 carry rotatable members 22, 23, respectively, which are rotatable in a vertical plane, the members 22 and 23 being connected together by a link 24 for simultaneous rocking motion. A rack 26 is arranged on the camera body in such a manner that is moved, against the action of a spring 25, by the magazine 4 as the latter is loaded in the camera and, to this end, the rack 26 is slidably disposed on the camera body by virtue of engagement between pins 27 and elongated slots 28. The rack 26 meshes with a toothed portion 29 formed on the bottom part of the lower rotary member 23. The upper and lower projection bars 10 and 16 have formed integrally therewith extensions 30 and 31, respectively, which abut against the rotary members 22 and 23, respectively. The lower parts of these extensions 30 and 31 are bent inwardly to provide reliefs or offsets 32 and 33 respectively.

Figure 2:
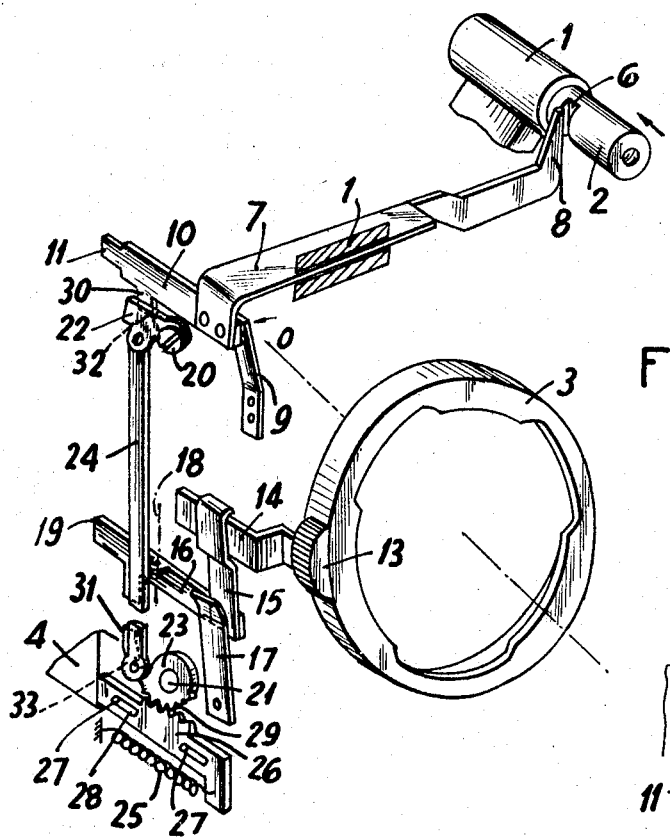
FIG. 2 is a perspective view of the same parts in the position when a magazine is mounted in the camera and an opaque slide plate is withdrawn from the magazine.
Figure 4:
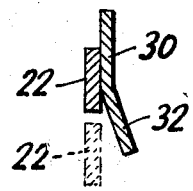
FIG. 4 is a transverse sectional view illustrating two different positions of a first releasable latch means.
Figure 5:
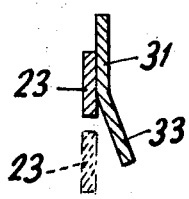
FIG. 5 is a transverse sectional view illustrating two different positions of a second releasable latch means.
Figure 3:
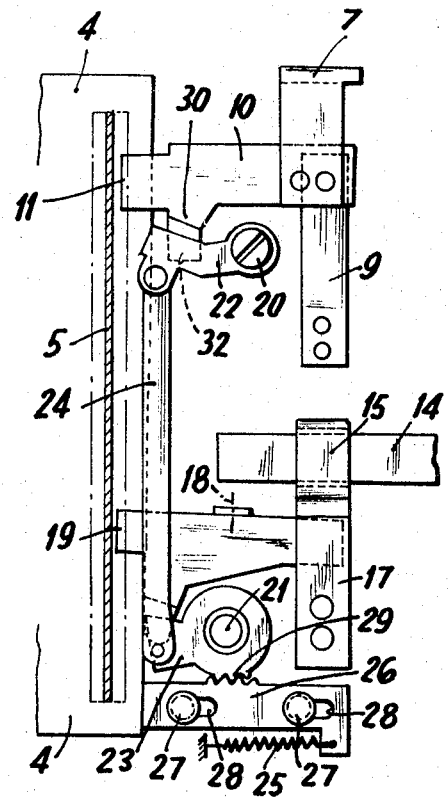
FIG. 3 is a side elevation view illustrating components of the invention.

The operation of the device described above is as follows:

When the magazine 4 is not loaded on the camera body 1, the rack 26 is biased by the spring 25 to its retracted position. Thus the lower rotary member 23 has been rotated clockwise as the rack is retracted, and hence has caused a clockwise rotation of the upper rotary member 22 through the link 24. As a result, the upper and lower rotary members 22 and 23 abut against the extensions 30 and 31 of the bars 10 and 16, respectively, thus resisting movement of these elements under the bias of the springs 9 and 17, respectively. Accordingly rod 7 is urged to the right, as viewed in FIG. 1, until its end 8 engages in the notch 6 in the release button 2, thereby locking or keeping button 2 inoperable. As the lower bar 16 is urged inwardly at its rear end 19, this bar is rotated clockwise about the pivot 18 against the action of the spring 17, thereby disengaging the detent plate 15 from the arm 14 to allow free rotation of the mounting ring 3 for the lens barrel. If now the magazine 4, with opaque slide plate 5 previously inserted therein, is loaded onto the camera body 1, a part of the magazine 4 pushes the rack 26 forward against the action of the spring 25 so that the engagement between the rack and toothed portion 29 causes the lower rotary member 23, and also the upper rotary member 22 through the link 24, to rotate counterclockwise. This results in a counterclockwise movement of rotary members 22, 23 to position opposite the relief 32, 33 of the extension 30, 31 integral with the upper or lower projection bar 10, 16, respectively. Because of the shape of the reliefs 32 and 33 as shown in FIGS. 4 and 5, respectively, where the position of members 22 and 23 in the lower position is shown in phantom lines, the extensions 30 and 31 are no longer restrained by these rotary members. However, at this time, since the opaque slide plate has not yet been withdrawn, both the end 11 of the upper bar 10 and the end 19 of the lower bar 16 are blocked against movement by the flange 12 of the plate. As a consequence, the rod 7 remains in its release locking position and the detent plate 15 remains disengaged from the arm 14 to allow free rotation of the mounting ring 3. Thus the release button is kept inoperable and the exchange of objectives is allowed. When the opaque slide plate 5 is withdrawn, the blocking action provided by the flange 12 is removed so that the rod 7 moves to the left under the bias of the spring 9 to disengage its end 8 from the notch 6 in the release button 2, thereby enabling a shutter release operation. At the same time, the lower bar 16 is urged by the spring 17 to move the detent plate 15 thereon into a position where it prevents rotation of the arm 14 and hence of the mounting ring 3, so that replacement of objectives is no longer possible (FIGS. 2 and 3).

When it is desired to change an objective while the camera is in use, it is sufficient to insert the opaque slide plate 5 into the magazine to cover the film surface. The bars 10 and 16 which have been urged by the springs 9 and 17 to the left until the reliefs 32 and 33 of the extensions 30 and 31 abut against the rotary members 22 and 23, respectively, are now moved to the right by the flange 12 as the opaque slide plate 5 is inserted. This results in the engagement of the end 8 of the rod 7 with the notch 6 for locking the release button 2 and also causes rotation of the lower bar 16 about pivot 18 to retract the detent plate 15 for freeing the rotation of the mounting ring 3, thereby enabling the exchange of objectives.

When the magazine 4 is dismounted from the camera body 1, the rack 26 returns to its original position under the action of the spring 25, thereby causing the rotary members 22 and 23 to rotate clockwise. The members 22 and 23 move from their engagement with the reliefs 32 and 33 into positions opposite the extensions 30 and 31, respectively, and thus constrain lateral movement of the bars 10 and 16 with the consequence that the shutter release button 2 is locked and the lens mounting ring 3 is freed for rotation.

From the foregoing, it will be appreciated that the invention has provided a safety device for photographic cameras with removable magazine and interchangeable objective, which is particularly effective for cameras having a lens shutter.

We claim:

1. In a photographic camera for use with exchangeable film magazines and interchangeable objectives, and including a body having an optical axis and arranged to receive a film magazine, a shutter release member displaceably mounted on the body, and an objective retaining ring on the body rotatable about the optical axis; the improvement comprising, in combination, first releasable latch means on said body cooperable with said shutter release member to lock the same against movement; second releasable latch means on said body cooperable with said retaining ring to lock the same against movement; means biasing said first latch means away from the locking position; means biasing said second latch means toward the locking position; movable means on said body cooperable with both said latch means and having a first position, constraining said latch means against movement by the associated biasing means, and a second position, releasing said latch means for movement by the associated biasing means; means biasing said movable means to its first position, said movable means being moved to its second position responsive to mounting of a magazine on said body; an opaque slide disengageably insertable in each magazine and blocking entry of light thereinto; and means on said slide operable, when the latter is inserted in a magazine mounted on said body, to move said first latch means to its locking position and said second latch means away from its locking position.

2. In a photographic camera, the improvement claimed in claim 1, in which said shutter release member is a release button having a laterally opening notch therein; said first releasable latch means including a longitudinally displaceable rod engageable in said notch.

3. In a photographic camera, the improvement claimed in claim 1, in which said retaining ring has an arm extending therefrom substantially parallel to the optical axis; said second releasable latch means including a catch engageable with said arm.

4. In a photographic camera, the improvement claimed in claim 1, in which said shutter release member comprises a release button formed with a laterally opening notch therein; said first releasable latch means including a longitudinally displaceable rod having one end engageable in said notch and having an arm extending perpendicularly from its opposite end and substantially parallel to the optical axis; said retaining ring including a second arm extending from the periphery thereof substantially parallel to the optical axis; said second releasable latch means including a third arm pivotally mounted intermediate its ends and extending substantially parallel to said first arm, and a catch mounted on one end of said third arm and releasably engageable with said second arm; said movable means including interconnected elements cooperable with said first and third arms to block, respectively, movement of said rod out of said notch and movement of said catch into engagement with said first arm.

5. In a photographic camera, the improvement claimed in claim 4, in which said first latch means comprises a detent member extending from said first arm and having an inner portion substantially coplanar with said first arm and a free end bent inwardly from said first portion toward the end of said rod engageable with said notch; said second releasable latch means including a detent member extending from said third arm on the portion thereof on the opposite side of its pivot from the portion carrying said catch, and having an inner portion substantially coplanar with said third arm and a free end bent toward the optical axis; said movable means including first and second oscillatable members having first portions abutting the inner portions of said detent members and second positions aligned with the bent free ends of said detent members.

6. In a photographic camera, the improvement claimed in claim 4, in which said means on said slide comprises a laterally projecting flange thereon engageable with said first arm and with the end of said second arm opposite that carrying said catch, upon insertion of said slide into a magazine mounted on said body.

7. In a photographic camera, the improvement claimed in claim 5, in which said second oscillatable member comprises a partial gear articulated by a link to said first oscillatable member; said movable means further including a longitudinally displaceable rack engageable with said partial gear and displaced, responsive to mounting of a magazine on said body, to rotate said oscillatable members to positions opposite the free ends of the associated detent members.